INVENTOR
HANS GRONAU
ATTORNEYS

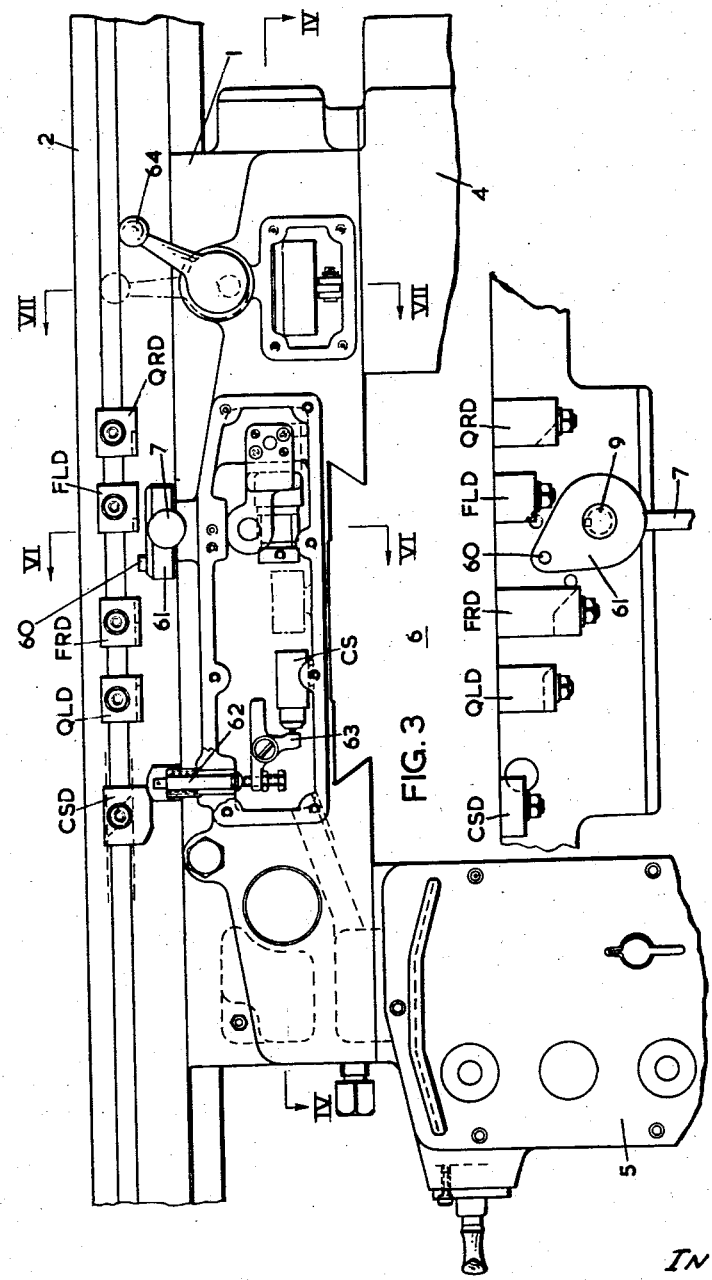

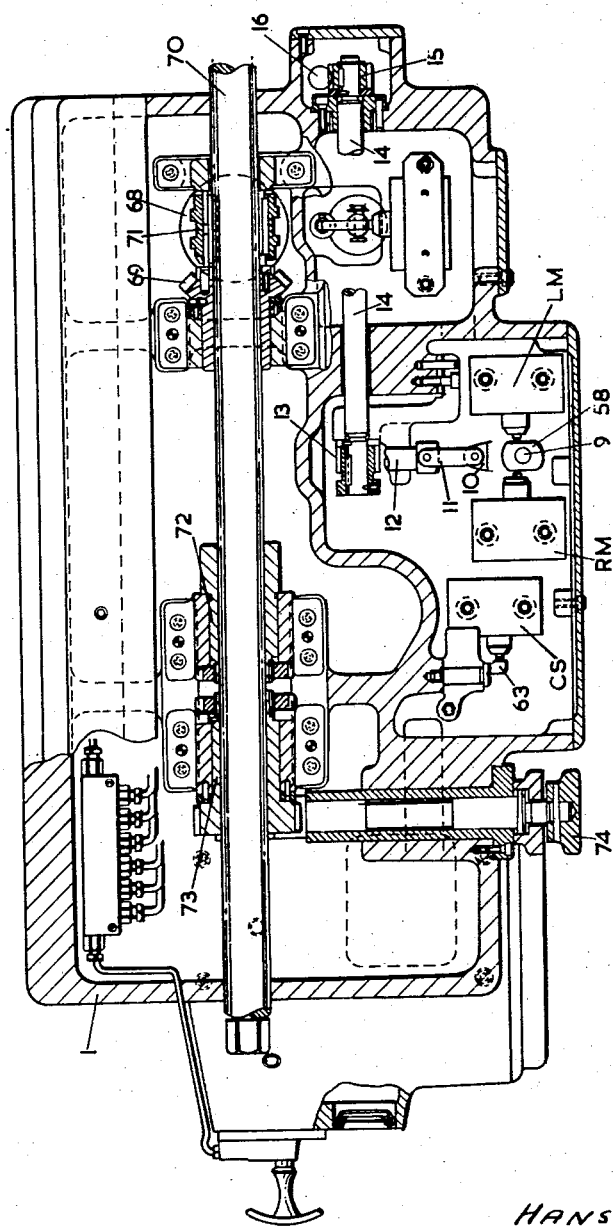

INVENTOR
HANS GRONAU
ATTORNEYS

Feb. 27, 1962 H. GRONAU 3,022,677
APPARATUS FOR CONTROLLING THE MOVEMENT
OF A RECIPROCATORY DRIVEN ELEMENT
Filed Dec. 30, 1957 12 Sheets-Sheet 12

INVENTOR
HANS GRONAU

By Hause and Nylich
ATTORNEYS

United States Patent Office
3,022,677
Patented Feb. 27, 1962

3,022,677
**APPARATUS FOR CONTROLLING THE MOVE-
MENT OF A RECIPROCATORY DRIVEN
ELEMENT**
Hans Gronau, London, England, assignor to Victoria
Machine Tool Company Limited, London, England,
a British company
Filed Dec. 30, 1957, Ser. No. 706,010
Claims priority, application Great Britain Dec. 28, 1956
6 Claims. (Cl. 74—472)

This invention relates to automatic milling machines and has for its object the provision of an improved automatic milling machine, particularly, but not exclusively, intended for production as a small knee type machine which can perform automatic table cycles.

The invention consists broadly of apparatus for controlling the feed table of a machine tool, comprising a reversible motor, a change speed transmission between said motor and said table, said transmission having a first setting at which it drives said table at feed speed and a second setting at which it drives said table at quick traverse speed, a common control element for controlling both the setting of said change speed transmission and the direction of operation of said motor, whereby said motor is initially energised for driving said table in a given direction from a starting position with said transmission at its second setting, said transmission is subsequently changed to its first setting, and said motor is subsequently reversed and said transmission changed to its second setting, and means for stopping said motor upon said table returning to its starting position.

Figure 1:
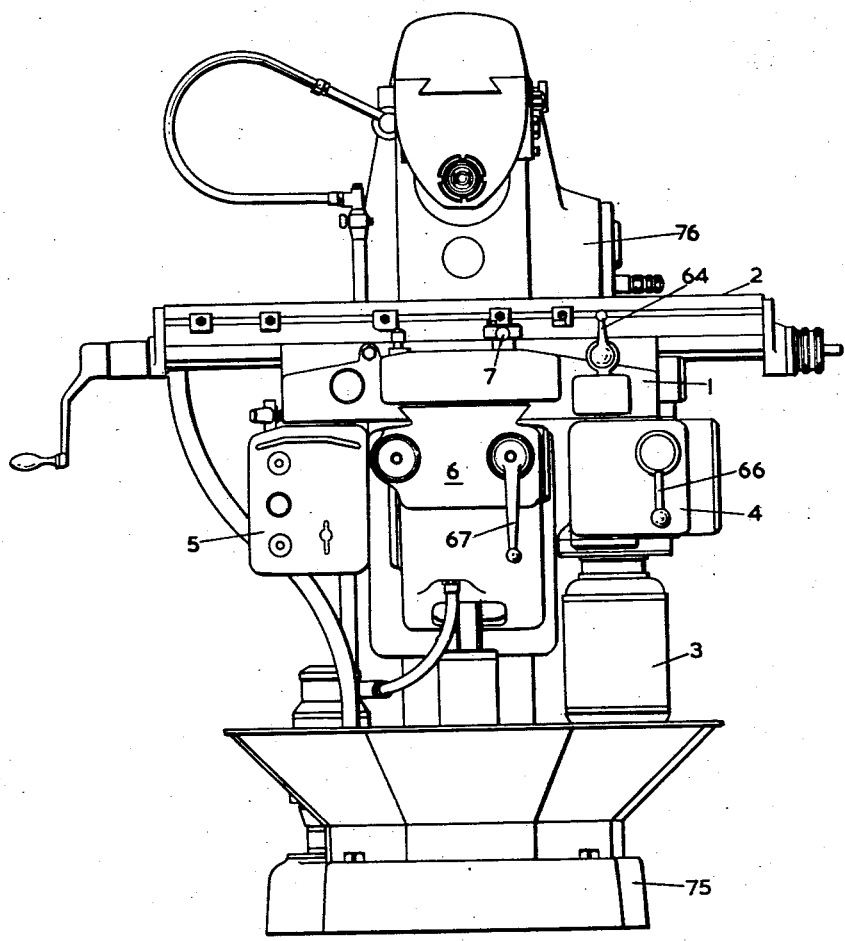
Figure 2:
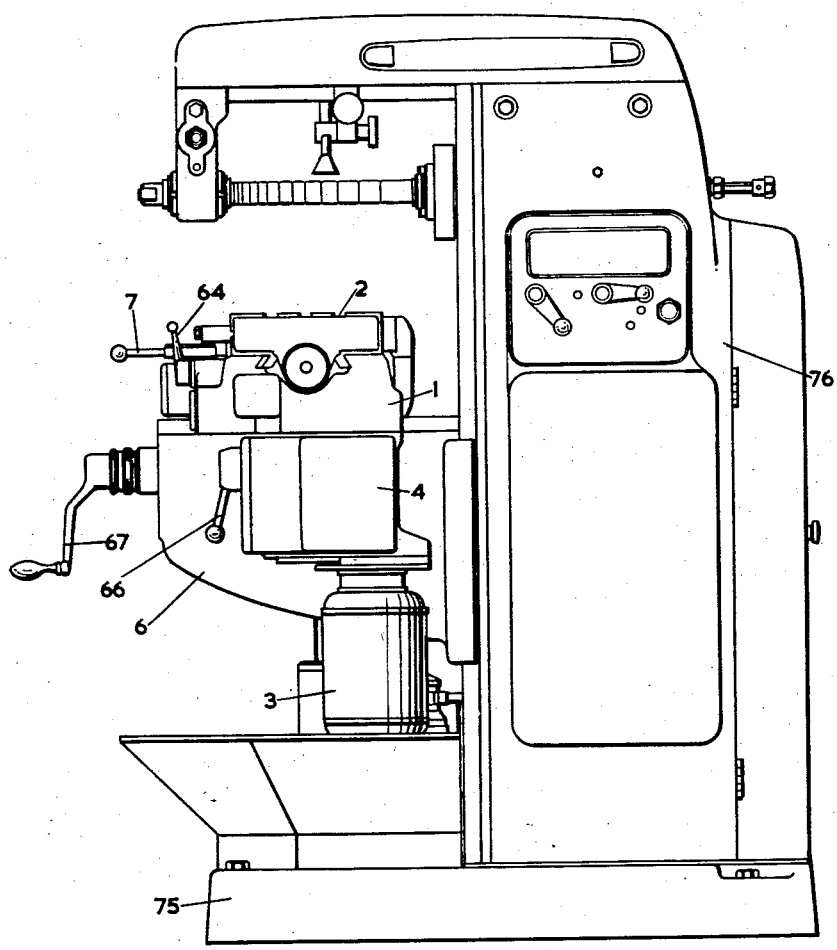
Figure 6:
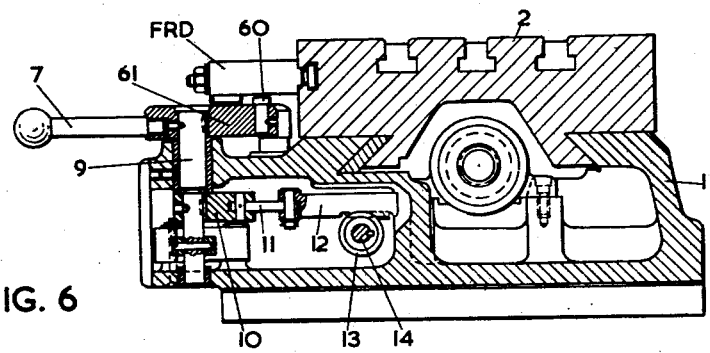
Figure 9:
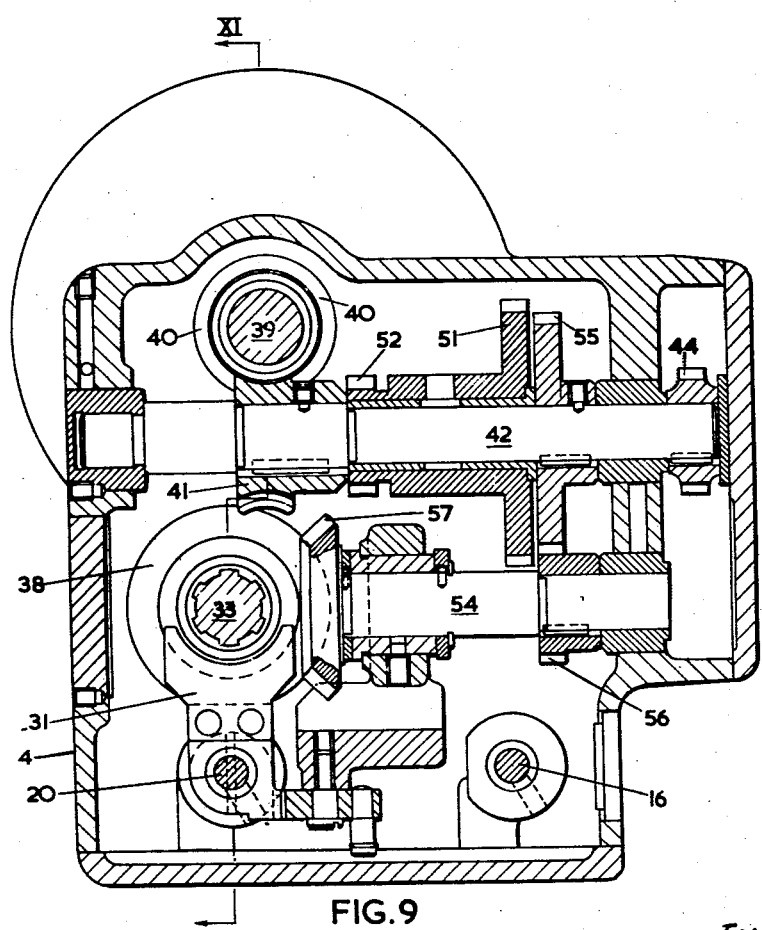
Figure 7:
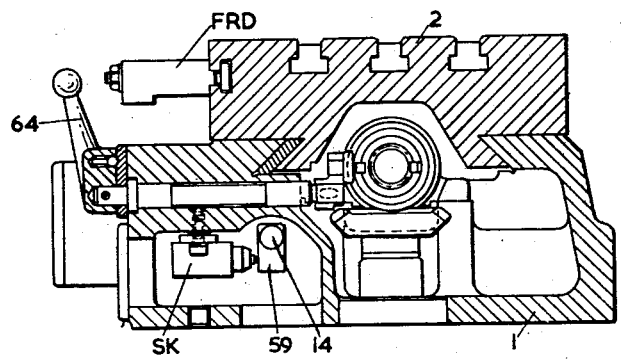
Figure 8:
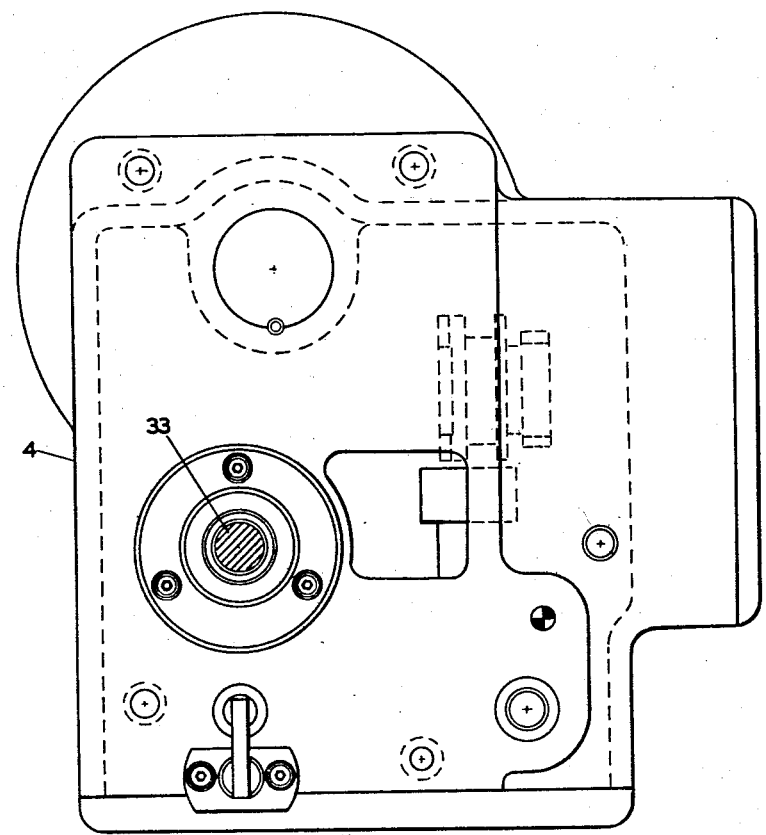
Figure 10:
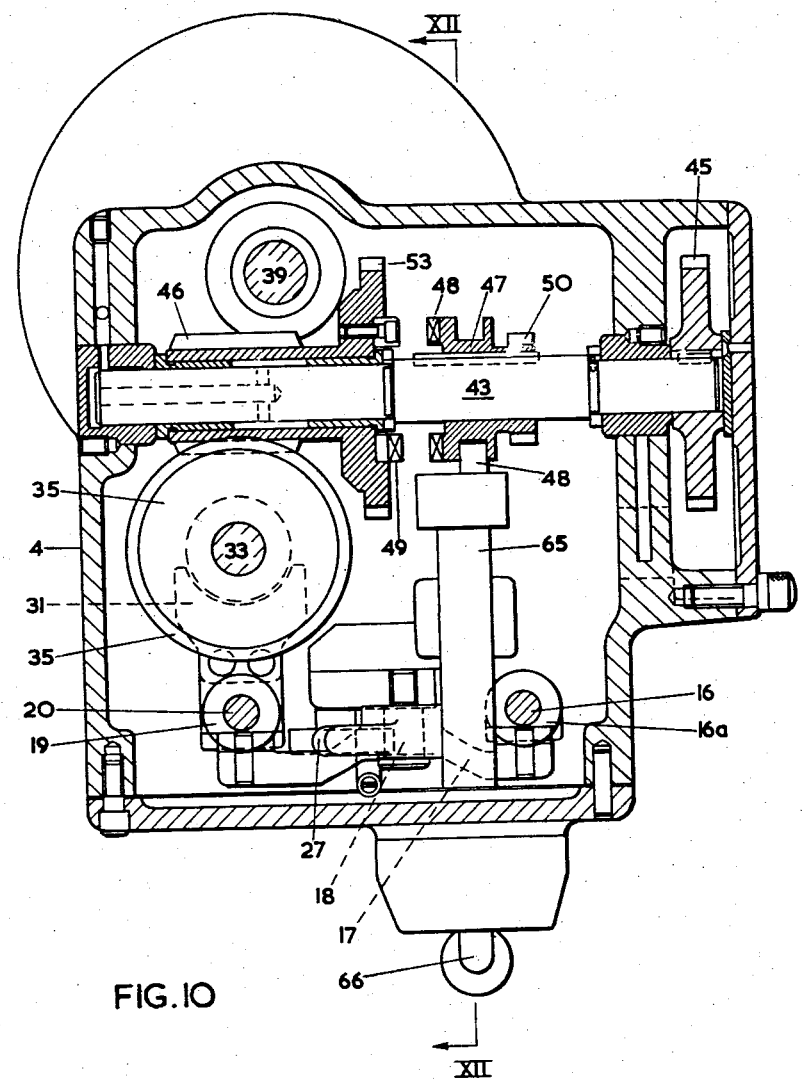
Figure 11:
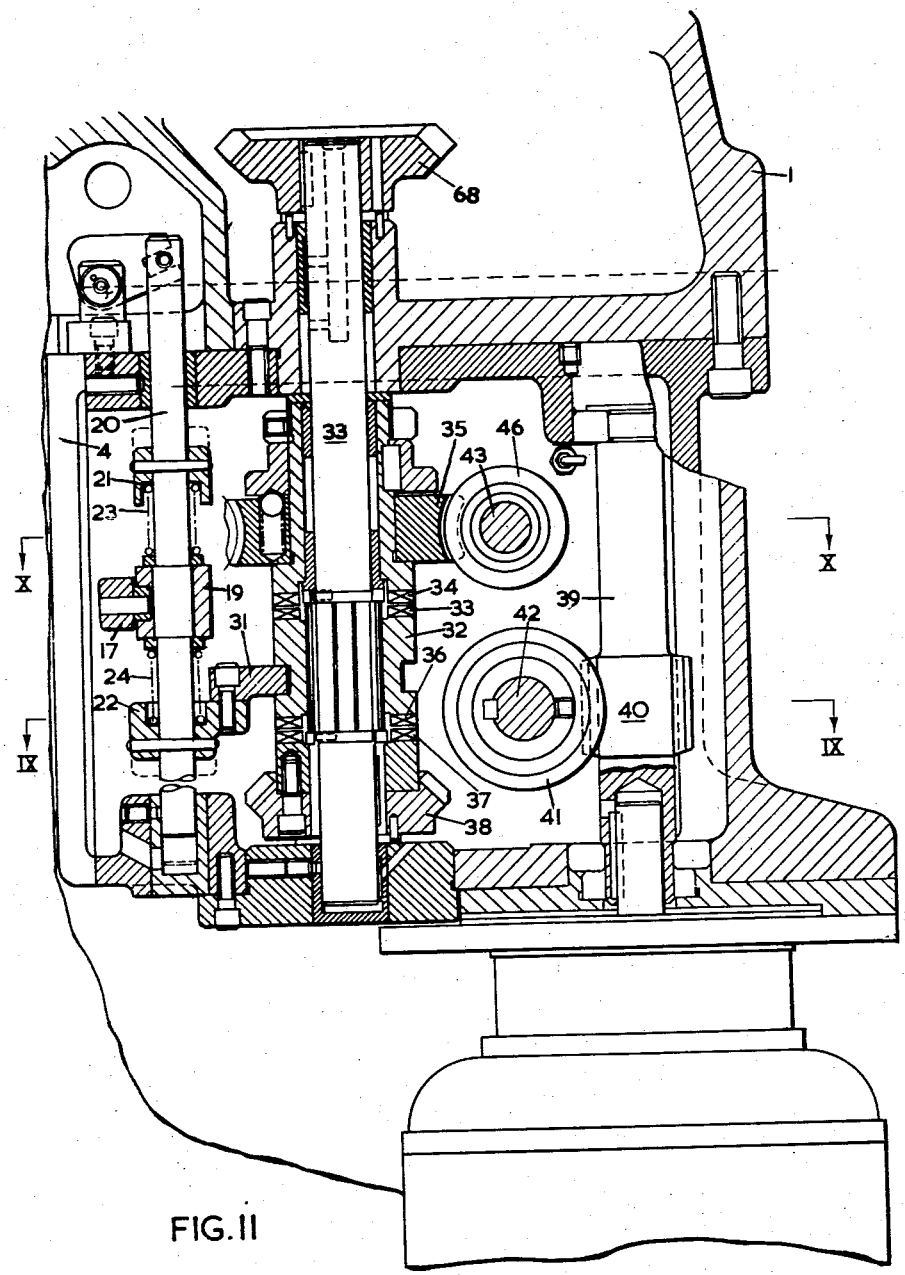
Figure 12:
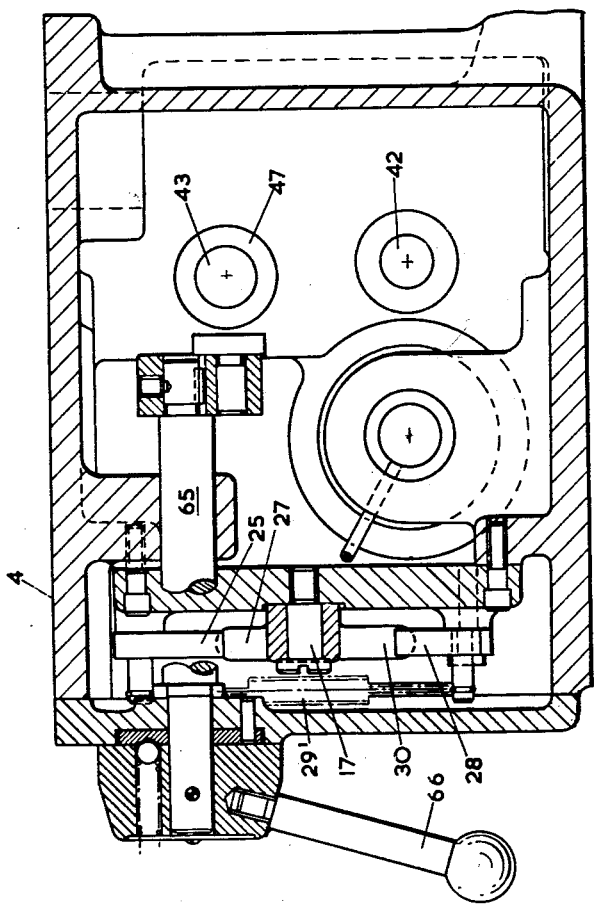
Figure 13:
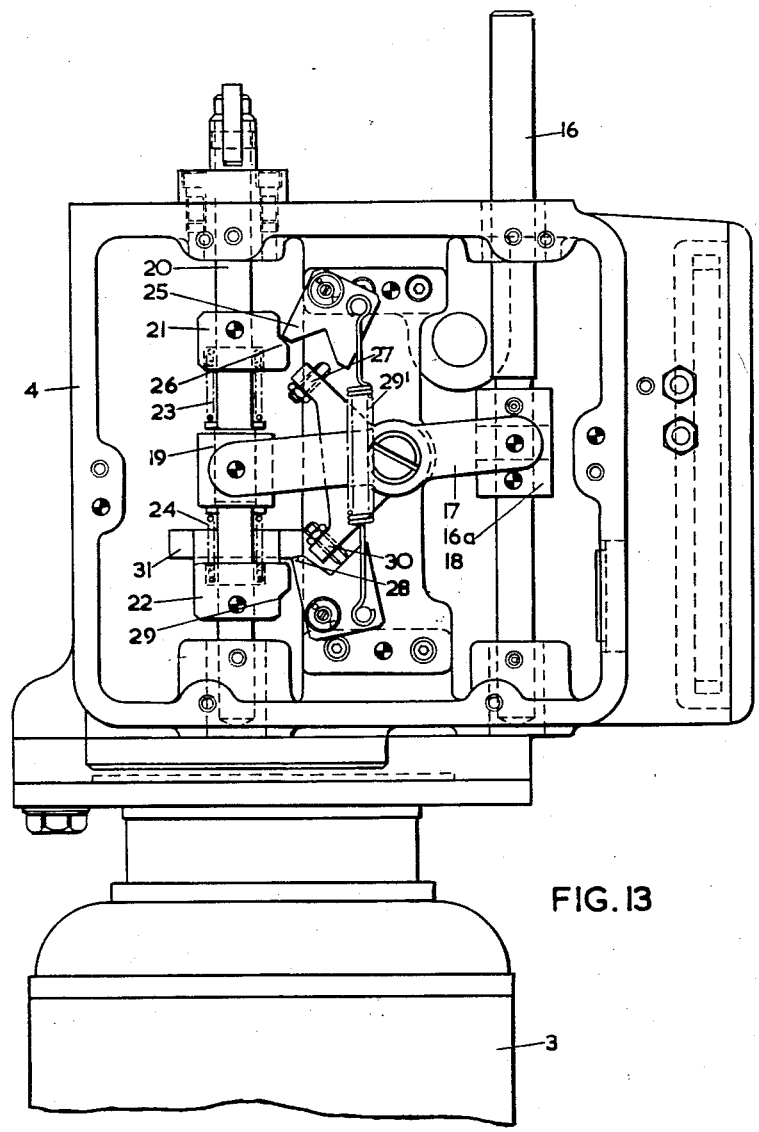
Figure 14:
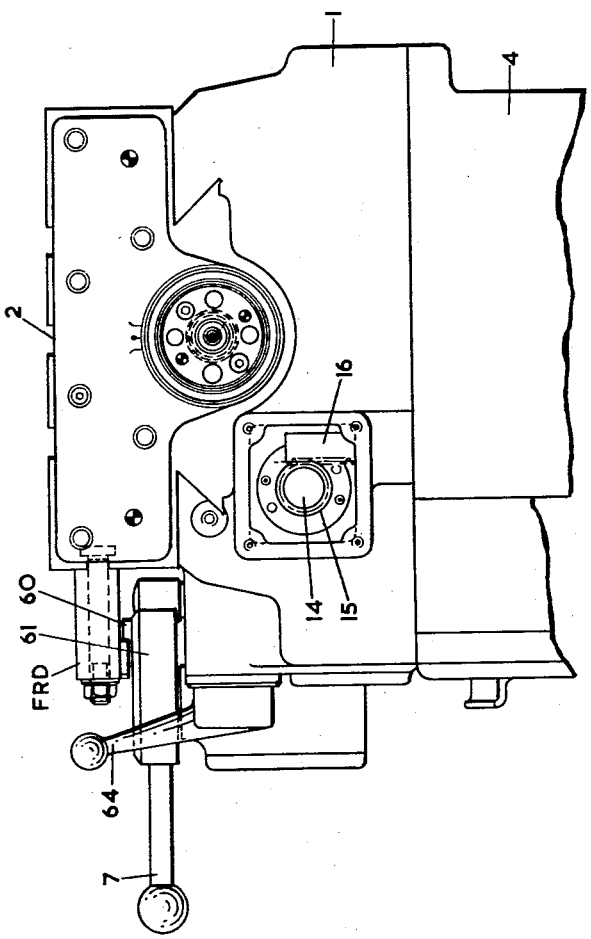
Figure 15:
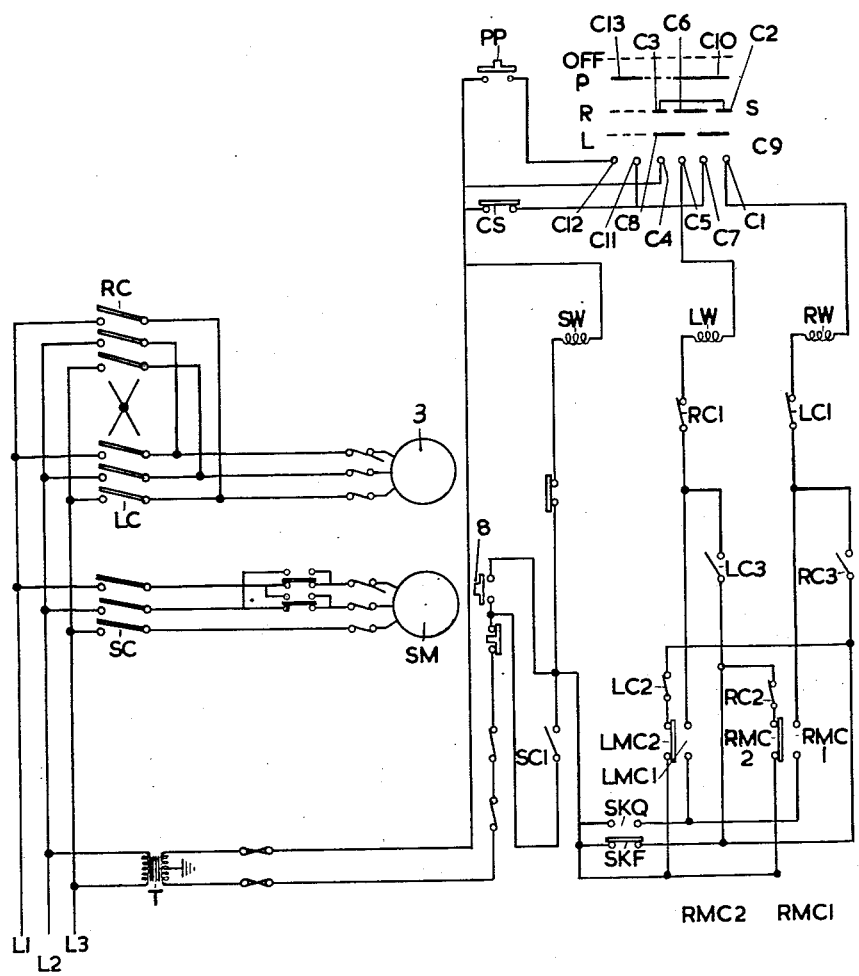

In order that the invention may be the more clearly understood a milling machine in accordance therewith will now be described, reference being made to the accompanying drawings, wherein:

FIGURE 1 is a front elevation of said milling machine;
FIGURE 2 is a side elevation of the same looking from the right of FIGURE 1;
FIGURE 3 is a front elevation to a larger scale of the saddle and part of the table of the machine, with cover portions removed, together with the switch gear casing and part of the gear box;
FIGURE 4 is a sectional plan taken on line IV—IV of FIGURE 3;
FIGURE 5 is a fragmentary plan of a part of FIGURE 3;
FIGURE 6 is a vertical section on line VI—VI of FIGURE 3;
FIGURE 7 is a vertical section on line VII—VII of FIGURE 3;
FIGURE 8 is a plan of the gear box;
FIGURE 9 is a sectional plan of the gear box on line IX—IX of FIGURE 11;
FIGURE 10 is a sectional plan of the gear box on line X—X of FIGURE 11;
FIGURE 11 is a sectional elevation of the gear box on line XI—XI of FIGURE 9;
FIGURE 12 is a sectional elevation on line XII—XII of FIGURE 10;
FIGURE 13 is a front elevation of the gear box with the front cover plate removed;
FIGURE 14 is an end elevation looking from the right of FIGURE 3 with a side cover plate removed;
FIGURE 15 is a circuit diagram.

Referring to the drawings, the milling machine comprises a saddle 1 which is slidable horizontally in a given direction (i.e. left and right according to FIGURE 2) and a table 2 mounted on said saddle and slidable horizontally in a direction at right angles to said given direction (i.e. left and right according to FIGURE 1). The sliding movement of the saddle 1 is effected manually by means of handle 67. The sliding movement of the table 2 is effected by means of an electric motor 3 through the medium of a gear box 4 and it is this sliding movement of the table with which the invention is concerned.

In the present arrangement the saddle 1, table 2, gear box 4 and electric motor 3, together with the necessary switch gear in a casing 5, form a complete assembly which are mounted on a standard machine having a base 75 and a column 76, with the saddle 1 slidable on the knee 6 of such machine.

The table 2 may be driven in either direction at either feed speed or quick traverse speed. The selection of the direction of drive of the table is effected by selecting the direction of rotation of the motor 3. The selection of the speed of drive of the table 2 is effected by selecting the transmission ratio of the drive from the motor 3 to the table.

The table 2 is capable of being operated on three alternative cycles, viz. a single cycle left, a single cycle right and a pendulum cycle. According to the single cycle left, the table 2 moves, from a central position, first to the left at quick traverse speed up to a given preselected point; then it continues to the left at feed speed to another preselected point; then it returns right at quick traverse speed to the central position. According to the single cycle right, the movement is the reverse, right being substituted for left and left for right. According to the pendulum cycle, the table continues to perform single cycles left and right alternately without stopping, the return quick traverse movement of the one cycle continuing into the first quick traverse movement of the next cycle.

Referring first to FIGURE 15, this illustrates a source of supply L1, L2, L3 which supplies the aforesaid motor 3 through either a right contactor RC if said motor is to drive the table to the right, or a left contactor LC if the motor is to drive said table to the left. Said right and left contactors RC and LC are normally open and are closed upon energisation of the contactor windings RW and LW respectively. Said right contactor RC also has first normally closed auxiliary contacts RC1, second normally closed auxiliary contacts RC2 and normally open auxiliary contacts RC3; and said left contactor LC likewise has first normally closed auxiliary contacts LC1, second normally closed auxiliary contacts LC2 and normally open auxiliary contacts LC3.

Said source of supply L1, L2, L3 also supplies the spindle motor SM through a normally open spindle motor contactor SC having an energizing winding SW. Said spindle motor contactor SC has a normally open maintaining contact SC1 thereon.

The control circuit for the contactors is supplied from the lines L2, L3 through a transformer T. Said control circuit includes in addition to the windings and auxiliary contacts already referred to, a selector switch S which comprises fixed contacts C1, C4, C5, C7, C11 and C12; and movable contacts C8, C9, C2, C3, C6, C10 and C13. Said selector switch has an off position at which the moving contacts are all disengaged from all the fixed contacts; a left position L at which the fixed contacts C1, C7 are bridged by the moving contact C9 and the fixed contacts C4, C5 are bridged by the moving contact C8; a right position at which the fixed contacts C5, C7 are bridged by the moving contact C6, and the fixed contacts C1, C4 are bridged by the connected moving contacts C2, C3; and a pendulum position P at which the fixed contacts C1, C7, C5 are bridged by the moving contact C10, and the fixed contacts C11, C12 are bridged by the moving contact C13.

Said control circuit also includes a right micro switch RM having a pair of normally open contacts RMC1 and a pair of normally closed contacts RMC2; and a left micro switch LM having a pair of normally open contacts LMC1 and a pair of normally closed contacts LMC2.

Said control circuit also includes a two position striker switch SK having one position at which a pair of quick traverse contacts SKQ are closed and a pair of "feed" contacts SKF are open, and another position at which said quick traverse contacts are open and said feed contacts are closed.

Finally said control circuit comprises a start push button 8, a normally open pendulum push button PP, and a normally closed cycle-stop switch CS.

We will now describe with reference mainly to FIGURE 15, the machine and its operation from a general or functional point of view: Mounted on the saddle 1 is a horizontal control lever 7 which rotates about a vertical axis. Assuming that it is wished to perform a single cycle right, the selector switch S is moved to the "right" position R, and the start push button 8 is depressed, thereby, from mains L1, L2 through transformer T, energising the coil SW of the spindle motor contactor SC and connecting the spindle motor SM to lines L1, L2, L3. The spindle of the machine, on which the milling cutter is mounted, therefore starts. The maintaining contact SC1 on said spindle motor contactor SC shunts the start push button 8 and maintains said spindle contactor closed. Next the control lever 7 is moved to its right hand position and thereby it mechanically closes the normally open contacts RMC1 and opens the normally closed contacts RMC2 of the right micro switch RM. This is, for the moment, without effect, but the continued movement of the control lever 7 to the right also operates to establish with a snap action, as will hereinafter appear, quick traverse speed ratio transmission from the motor 3 to the table 2, and to operate the two-position striker switch SK to the position at which the quick traverse contacts SKQ are closed, and thereby an energising circuit is established for the winding RW of the right contactor RC, said circuit being traced through the maintaining contacts SC1 on the spindle contactor, said quick traverse contacts SKQ of said striker switch SK said normally open contacts RMC1 of said right micro switch RM, first normally closed contacts LC1 of the left motor contactor LC, the coil RW of said right motor contactor RC, and contacts C1, C2, C3, C4 on the selector switch S.

Said right contactor RC accordingly closes and energises the motor 3 in the direction for driving the table 2 to the right, and, as the transmission from the motor to the table is established for driving the table at quick traverse speed, the table is driven at quick traverse speed to the right.

Said right hand contactor RC through the normally open auxiliary contacts RC3, upon closing, establishes a maintaining circuit for its winding RW through the normally closed contacts LMC2 of the left micro-switch LM, and second normally closed auxiliary contacts LC2 on said left motor contactor.

The control lever 7, having been moved to its right hand position remains there, owing to the aforesaid snap action, and the operator's hand is removed from said control lever. The table 2 continues to be driven at quick traverse speed to the right until, at the aforesaid given preselected point, a feed-right dog FRD (FIGURES 3 and 5) on said table engages said control lever 7 and returns it to its central position. This returns the transmission with a snap action, to "feed" speed ratio, and also operates said striker switch SK to open its "quick traverse" contacts SKQ and close said "feed" contacts SKF. Also the return of the control lever 7 to its central position enables the right micro-switch RM to open its normally open contacts RMC1 and close its normally closed contacts RMC2.

The winding RW of the right contactor RC still remains energised through its aforesaid maintaining circuit and indeed the feed contacts SKF of the striker switch SK shunt the part of said maintaining circuit which includes the normally closed contacts LMC2 of the left micro-switch LM and the second normally closed contacts LC2 on the left motor contactor.

The table 2 therefore continues to be driven to the right but now at feed speed. When said table reaches the next pre-selected point, a quick-traverse-left dog QLD thereon actuates the control lever 7 to the left, thereby with a snap action, re-establishing quick traverse transmission ratio between the motor 3 and the table 2. At the same time the control lever 7 opens the normally closed contacts LMC2, and closes the normally open contacts LMC1, of the left micro-switch, and opens the feed contacts SKF and closes the quick traverse contacts SKQ of the striker switch.

Opening of the normally closed contacts of the left micro-switch LMC2 and the feed contacts SKF of the striker switch interrupts both limbs of the maintaining circuit of the winding RW of the right motor contactor RC, so the motor 3 stops and therefore the table 2 stops, and this is timed to take place just before the quick traverse transmission ratio is re-established.

A circuit is now established for energising the coil LW of the left motor contactor LC, said circuit being traced through the maintaining contacts SC1 of the spindle contactor, the quick traverse contacts SKQ of the striker switch SK, the normally open contacts LMC1 of the left micro-switch, normally closed contacts RC1 on the right contactor, said coil LW of the left contactor, contacts C5, C6, C7 of the selector switch S, and the normally closed cycle stop switch CS.

The left motor contactor LC therefore closes and the table 2 is returned to the left at quick traverse speed. When the table reaches the central position, another dog CSD thereon (FIGURES 3 and 5) opens the cycle stop switch CS and the left contactor LC drops out and the motor stops, the cycle being completed.

Another cycle will be effected by again throwing the control lever 7 to the right hand position.

The above description of the performance of a single cycle right applies equally to the performance of a single cycle left, if throughout said description the word "left" is substituted for the word "right" and vice versa, and the reference L is substituted for the reference R and vice versa, and provided that it is noted that, for the single cycle left, the winding LW is energised through contacts C5, C8, C4 of the selector switch S, and the winding RW is energised through contacts C1, C9, C7 of said selector switch.

If it is wished to perform a continuous pendulum cycle, the selector switch S is moved to the "pendulum" position P. If it is wished to start with a table movement to the right, the control lever 7 is moved to the right, the start switch 8 having of course been depressed to start the spindle motor SM. This however is now without effect until the normally open pendulum push button PP is also momentarily depressed. This is because the initial circuit for the coil RW of the right motor contactor RC is directed by the selector switch S, at the pendulum position P, by contacts C1, C10, C7, to the cycle stop switch CS which is open when starting with the table at the central position. The selector switch S, however, has contacts which, at the pendulum position P, connect said pendulum push button PP in shunt with said cycle stop switch CS, and when said pendulum push button is depressed, in addition to moving the control lever 7 to the right, a cycle right will be performed as heretofore described, the stop switch CS closing, as soon as the table leaves the central position, and enabling the push button PP to be released.

When the cycle right is completed by the table being returned leftwards at quick traverse speed to the central position, the cycle stop switch CS will open, but if the operator is, at that moment, depressing the pendulum push button PP, the left motor contactor LC will remain closed and the table 2 will move into a cycle left.

In like manner on completion of the cycle left, if the operator is depressing the pendulum push button PP, the table will continue into a cycle right and so on. If on completion of a cycle left or a cycle right, the operator is not depressing the pendulum push button PP, the motor 3 and table 2 will stop, but, immediately the operator thereafter depresses said pendulum push button PP the motor 3 will restart the table into a cycle right or a cycle left as the case may be.

The pendulum cycle is normally employed when the machine is being used with work loading stations at either end of the table. The operator loads at one end while a cut is being made at the other. As soon as he has finished loading at said one end, he depresses the pendulum push button PP. If the cycle at said other end has been completed and the table is at rest, depression of the pendulum push button PP will immediately restart it to perform the cycle at said one end. If the cycle at said other end has not been completed, depression of said pendulum push button PP will enable said cycle to continue, without pausing, straight into the cycle at said one end.

We will now describe the mechanical and constructional features of the illustrated embodiment of the invention.

The general form of the aforesaid assembly of saddle 1, table 2, gear box 4, motor 3 etc. is that the table 2 is of course mounted on the top of the saddle; the gear box 4 depends downwards from say the right hand end of the saddle 1; the motor 3 depends down from the bottom of the gear box 4 with its shaft vertical, and a switch-gear casing 5 depends downwards from the left hand end of the saddle 1. Thus, the gear box 4 and motor 3 on the one hand and the switch-gear casing 5 on the other, depend down on each side of the knee 6 on which the saddle is mounted.

The control lever 7 extends forwards from the saddle 1, at right angles when at its centre position. It is mounted fast on the upper end of a rotatable vertical shaft 9 (FIGURES 4, 5 and 6) within the saddle 1. Said shaft 9 has a horizontal crank arm 10 fast on it, and the end of said arm is connected through a link 11 to the end of a horizontal longitudinally movable rack 12. When the control lever 7 is at its centre position, said control lever, said crank arm 10, said link 11 and said rack 12 are in a common vertical plane transverse to the length of the saddle.

The rack 12 engages with a pinion 13 fast on the end of a horizontal control shaft 14 extending longitudinally of the saddle to the right. The right hand end of said control shaft 14 is fast with another pinion 15 which engages with rack teeth on the upper end of a vertical rod 16 (FIGURE 14) which extends downwards into the gear box 4 (FIGURE 13). It will be seen that when the control lever 7 is at its centre position the vertical rod 16 will be at one end of its stroke, and, when said control lever is at its right hand or its left hand position, said vertical rod 16 will be at the other end of its stroke. Actually the former end is the down end and the latter end the up end.

Within the gear box 4 is a roughly horizontal lever 17 (FIGURE 13) which rotates about a horizontal axis 18 between its ends. One end of said lever is coupled by means of a slotted block 16a to said vertical rod 16 so that said lever oscillates as said vertical rod moves up and down. The other end of said lever is coupled to an operating block 19 which is slidable up and down a second vertical rod 20, which is itself slidable up and down. Said rod 20 has fast thereon an upper boss 21 above said operating block 19 and a lower boss 22 below said operating block 19, and upper and lower helical springs 23 and 24 are in compression respectively between said upper and lower bosses 21, 22 on the one hand and said operating block 19 on the other.

Assuming that the vertical rod 16 is at its up position, the operating block 19 will be at its down position, and the vertical rod 20 will also be at its down position, with the helical springs 23, 24 equally compressed. At this position an upper spring catch 25 will be engaging with a shoulder 26 on the upper boss 21 so as to prevent upward movement of said vertical rod 20. If now the vertical rod 16 is moved to its down position the operating block 19 will move to its up position but during the first part of its movement the vertical rod 20, owing to the aforesaid upper catch 25, will remain stationary, and the upper helical spring 23 will be compressed. Just before the operating block 19 reaches the upper end of its stroke, an arm 27 on the lever 17 engages said upper catch 25 and shifts it to a release position so that said vertical rod 20 springs to its up position with a snap action.

A shoulder 29 on the lower boss 22 is now engaged by a lower catch 28 so that the vertical rod 20 cannot move downwards, and when the vertical rod 16 is returned to its up position a similar movement as before is imparted to said vertical rod 20, the lower helical spring 24 being first compressed until the lower catch 28 is released by another arm 30 on the lever 17, whereupon said vertical rod 20 springs to its down position. It will be seen that both catches 25 and 28 are spring biased by means of a common spring 29' so that the upper one 25 springs into the locking position when the vertical rod 20 is down and the lower one 28 when said vertical rod 20 is up.

Said vertical rod 20 has mounted fast thereon a glut 31 (see also FIGURE 11), which engages the moving element 32 of a double dog clutch. This moving element 32 is in splined relation on a vertical driving shaft 33 whose rotation in either direction effects movement of the table 2 in either direction. Thus when the vertical rod 20 moves up, the moving dog clutch element 32 moves up, and thereby dog teeth 33 on its upper end engage dog teeth 34 fast with a worm wheel 35 loose on said vertical driving shaft 33, which worm wheel 35 is coupled (as will hereinafter appear) to the motor 3 through the feed drive transmission, and when said vertical rod 20 moves down the moving dog clutch element 32 moves down, and thereby dog teeth 36 on its lower end engage dog teeth 37 fast with a bevel gear 38 loose on said vertical rod 33, which bevel gear is coupled (as will hereinafter appear) to the motor 3 through the quick traverse drive transmission. In other words, according as said dog clutch element 32 is up or down, feed transmission or quick traverse transmission to the table 2 is established, and it will accordingly be seen that, as heretofore stated, when the control lever 7 is moved to the central position, the feed transmission is established with a snap action, and when said control lever 7 is moved to either its right or left hand position, the quick traverse transmission is established with a snap action.

The motor shaft has an upward extension 39 into the gear box 4. The feed drive transmission is by way of a worm 40 fast on said motor shaft extension 39, said worm 40 engaging a worm wheel 41 fast on a horizontal shaft 42 in said gear box (see also FIGURE 9), and thence to a second horizontal shaft 43 (see also FIGURE 10) by way of two directly meshing gear wheels 44 and 45 (FIGURES 9 and 10) fast on said two horizontal shafts respectively. The horizontal shaft 43 has a worm 46 on it which is in mesh with the aforesaid worm wheel 35 on the vertical driving shaft 33 for driving the table 2.

The two directly meshing gear wheels 44 and 45 by which said two horizontal shafts 42 and 43 are coupled together can be changed for varying the transmission ratio between said two shafts, and thereby varying the speed ratio of the feed drive transmission, over a range of speed ratios. This range of speed ratios is capable of being doubled in the following way: The aforesaid worm 46 on the horizontal shaft 43 is not necessarily fast on said horizontal shaft 43. It can be secured fast to said horizontal shaft 43 by means of a sleeve 47 (FIGURE 10) in splined relation on the latter, which sleeve has dog teeth 48 which at a direct drive position of said sleeve engage dog teeth 49 on said worm 46. When said sleeve 47 is slid to a lower speed ratio position, its dog teeth 48 disengage those 49 on the worm 46 and a gear wheel 50 thereon engages a bigger gear wheel 51 (FIGURE 9) loose on said horizontal shaft 42 and fast with another gear wheel 52 which is in permanent engagement with a bigger gear wheel 53 (FIGURE 10) fast on said worm. The axial movement of said sleeve 47 is controlled by means of a glut 48 controlled through a shaft 65 by means of a hand lever 66 outside the gear box 4.

The quick traverse transmission may be traced from the motor 3 to the said horizontal shaft 42 as before and thence to a horizontal shaft 54 (FIGURE 9), at step-up speed ratio, by means of engaging gears 55 and 56 fast on said shafts 42 and 54 respectively, and thence from said horizontal shaft 54, by means of a bevel gear 57 fast thereon to the aforesaid bevel gear 38 (FIGURE 11) on the vertical driving shaft 33 which drives the table.

The transmission from said shaft 33 to the table 2 is constituted by a bevel gear 68 on the upper end of said shaft 33 which is in mesh with a bevel gear 69 (FIGURE 4) which runs loose on a shaft 70. A sleeve 71 is in splined relation on said shaft 70 and has dog teeth thereon which engage or disengage dog teeth on the bevel gear 69, according as said sleeve is slid left or right, thereby coupling or uncoupling said bevel gear 69 to the shaft 70. Said shaft 70 is screw threaded and forms a lead screw, and is connected to the table 2 so that the latter is constrained to move longitudinally therewith, and said shaft 70, as it is rotated in one or other direction, screws itself longitudinally in one or other direction relative to fixed nuts 72 and 73, thereby moving the table 2 in one or other direction. The sleeve 71 is slid left or right by a declutching lever 64. The adjusting knob 74 is for the purpose of adjusting a backlash minimising device for the purpose of minimising backlash between the lead screw 70 and the nuts 72 and 73.

For providing that the movement, right or left, of the control lever 7 shifts the right or left micro-switch RM or LM from its normal to its abnormal position, said micro-switches are arranged on each side of the vertical shaft 9 of said control lever 7 (see FIGURE 4) and said shaft has fast thereon a cam 58 which engages one or other of the operating plungers of said micro-switches according as said control lever moves right or left. It will be noted that the shaft 9 is displaced forwardly with respect to the line of the plungers of the switches RM and LM, so that only the rear part of the cam 58 is operative as said shaft rocks. Movement of the lever 7 to the right rocks the shaft 9 counter-clockwise and causes the cam 58 to depress the plunger of the micro switch RM against its spring. This causes the normally open contacts RMC1 to be closed and the normally closed contacts RMC2 to be opened. Return of the lever 7 to normal permits the plunger spring to return the said contacts RMC1 and RMC2 to normal. In an analogous manner, movement of the lever 7 to the left causes depression of the plunger of the micro switch LM, whereby the normally open contacts LMC1 are closed and the normally closed contacts LMC2 are opened, and return of said lever to normal permits these last named contacts to return to normal.

The striker switch SK is also a micro-switch; it is mounted on the saddle 1 and its operation is effected by means of a cam 59 on the horizontal longitudinal control shaft 14 (see FIGURE 7). Thus, at the normal position shown in FIGURE 7, the cam or arm 59 is compressing the plunger of the micro switch SK against its spring, so that the contacts SKF are closed and the contacts SKQ are open. Movement of the control lever 7 to the left or to the right causes the rack 12 (FIGURES 4 and 6) to be pulled forwardly, and the shaft 14 to be rocked counter-clockwise. This moves the cam or arm 59 away from the plunger of the switch SK, so that the plunger spring prevails and the contacts SKF are opened and the contacts SKQ closed. Return of the return lever 7 to the central position returns the cam 59 to the position shown in FIGURE 7 and thereby returns said contacts SKF and SKQ to their original positions.

The dogs FLD, FRD etc. for actuating the control lever 7 are adjustably secured to the front surface of the table 2 (see FIGURES 3, 5 and 6) and have operative or cam portions which extend downwards so that, at the appropriate positions of the table, they are adapted to engage with a pin 60 which extends upwards from a radial arm 61 on the vertical shaft 9 of said control lever.

The stop dog CSD is also adjustably secured to the front surface of the table 2 and the cycle stop switch CS, which is also a micro-switch, is mounted at an appropriate position on the saddle 1. At the appropriate point said stop dog CSD engages the top of a spring loaded plunger 62 mounted on the saddle and presses it down thereby rocking a lever 63 mounted on the saddle and actuating said cycle stop switch CS.

I claim:

1. Apparatus for controlling the movement of a reciprocatable driven element comprising, in combination, a reversible motor, a change-speed transmission connected between said motor and said driven element, said transmission having a first setting for relatively high speed transmission and a second setting for relatively slow speed transmission, a single control element, an actuating mechanism connected between said control element and said change-speed transmission, electric circuit control means for controlling the direction of rotation of said motor, said control element controlling said control means and controlling by means of said actuating mechanism the setting of said transmission for movement of said driven element in one or the other direction and at one or the other velocity selectively, and mechanical sensing means controlling the movement of said control element in response to changes in the position of said driven element whereby automatic reciprocatory cycles of movement of the driven element may be effected.

2. Apparatus for controlling the movement of a reciprocatable driven element comprising, in combination, a reversible motor, a change-speed transmission connected between said motor and said driven element, said transmission having a first setting for relatively high speed transmission and a second setting for relatively slow speed transmission, a control element, said control element having a center position and positions on each side of said center position, mechanical coupling means between said control element and said change-speed transmission, said control element in said center position fixing said transmission at said first setting, and said control element at either side position fixing said transmission at said second setting, electric circuit control means controlling the direction of rotation of said motor, said control element controlling said control means and the setting of said transmission, whereby on first movement of said control element to one side position said motor is energized for one direction of rotation, on return of said control element to said center position said motor remaining energized for said one direction, movement of said control element to said other side position energizing said motor in an opposite direction, return of said control element to said center position de-energizing said motor, and sensing means controlling the direction of movement of said control element in response to the position of said driven element.

3. A change-speed transmission apparatus comprising, in combination, a reciprocatable gear change element having a first position for relatively high speed transmission and a second position for relatively low speed transmission, a first spring loaded catch to retain said gear change element at said first position, a second spring loaded catch to retain said gear change element at said second position, a reciprocatable operating element having a first position and a second position, a first spring transmissively connected between said operating element and said gear change element whereby movement of said operating element from its first towards its second position strains said first spring to bias said gear change element towards its second position, a first catch-actuating member coupled to said operating element, whereby as said operating element approaches relatively close to its second position, said first catch-actuating member moves said first catch from its retaining position, thereby permitting said gear change element to move with a snap action to its second position, a second spring transmissively connected between said operating element and said gear change element, whereby movement of said operating element from its second towards its first position trains said second spring to bias said gear change element towards its first position, and a second catch-actuating member coupled to said operating element, whereby as said operating element approaches relatively close to said first position said second catch-actuating member moves said second catch from its retaining position, thereby permitting said gear-change element to move with a snap action to its first position.

4. Apparatus according to claim 3, in which said gear change element consists of a longitudinally reciprocable rod and two bosses mounted on said rod at spaced intervals therealong, and said spring-loaded catches respectively engage said bosses to retain said rod at its respective positions, and comprising an operating block slidably mounted on said rod between said bosses, and reciprocated according as said operating element is reciprocated, said springs being coiled on said rod on opposite sides of said operating block, whereby movement of said operating block in one direction compresses one spring against one boss and movement of said operating block in the other direction compresses the other spring against the other boss.

5. Apparatus according to claim 4, and comprising a lever pivoted between its ends and connected at one end to said operating element and at the other end to said operating block, whereby movement of said operating element in one direction effects movement of said operating block in the other direction, and wherein said catch-actuating members are mounted on said lever.

6. Apparatus according to claim 3, and comprising an oscillatable control element, a crank fast with said control element, a link conected at one end to said crank and at the other end to a reciprocatable member, whereby movement of said control element in opposite directions from a central position causes said reciprocatable member to move in the same direction, rack teeth on said reciprocatable member, rack teeth on said reciprocatable operating element, and a pinion engaging both of said rack teeth.

References Cited in the file of this patent

UNITED STATES PATENTS

| | | |
|---|---|---|
| 2,054,165 | Nenninger | Sept. 15, 1936 |
| 2,078,871 | Panzner | Apr. 27, 1937 |
| 2,109,615 | Durham | Mar. 1, 1938 |
| 2,304,375 | Peterson | Dec. 8, 1942 |
| 2,400,815 | Forman | May 21, 1946 |
| 2,660,932 | Kemper et al. | Dec. 1, 1953 |
| 2,871,716 | Stade | Feb. 3, 1959 |